United States Patent
Han et al.

(10) Patent No.: US 11,423,702 B2
(45) Date of Patent: *Aug. 23, 2022

(54) OBJECT RECOGNITION METHOD AND APPARATUS

(71) Applicant: Samsung Electronics Co., Ltd., Suwon-si (KR)

(72) Inventors: SeungJu Han, Seoul (KR); SungUn Park, Suwon-si (KR); JaeJoon Han, Seoul (KR); Jinwoo Son, Seoul (KR); ChangYong Son, Anyang-si (KR); Minsu Ko, Suwon-si (KR); Jihye Kim, Anyang-si (KR); Chang Kyu Choi, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 103 days.

This patent is subject to a terminal disclaimer.

(21) Appl. No.: 17/089,902

(22) Filed: Nov. 5, 2020

(65) Prior Publication Data

US 2021/0056332 A1 Feb. 25, 2021

Related U.S. Application Data

(63) Continuation of application No. 16/176,440, filed on Oct. 31, 2018, now Pat. No. 10,853,678.

(30) Foreign Application Priority Data

Dec. 15, 2017 (KR) .................. 10-2017-0173573

(51) Int. Cl.
 *G06V 40/16* (2022.01)
 *G06V 40/40* (2022.01)
(52) U.S. Cl.
 CPC .............. *G06V 40/45* (2022.01); *G06V 40/16* (2022.01); *G06V 40/172* (2022.01)

(58) Field of Classification Search
 CPC ... G06V 40/40–45; G06V 40/72; G06V 40/16
 See application file for complete search history.

(56) References Cited

U.S. PATENT DOCUMENTS

| 8,542,879 B1 * | 9/2013 | Nechyba | G06V 40/45 |
| | | | 382/118 |
| 2011/0150269 A1 * | 6/2011 | Yoshioka | H04N 21/8358 |
| | | | 382/100 |

(Continued)

FOREIGN PATENT DOCUMENTS

| CN | 102831392 A | 12/2012 |
| CN | 103886301 A | 6/2014 |

(Continued)

OTHER PUBLICATIONS

Huang G., et al., "Learning Hierarchical Representations for Face Verification with Convolutional Deep Belief Networks", *2012 IEEE Conference on Computer Vision and Pattern Recognition*, Jun. 2012, pp. 2518-2525 (8 pages in English).

(Continued)

*Primary Examiner* — Sean T Motsinger
(74) *Attorney, Agent, or Firm* — NSIP Law

(57) ABSTRACT

An object recognition apparatus and method are provided. The apparatus includes a processor configured to verify a target image using an object model and based on reference intermediate data extracted by a partial layer of the object model as used in an object recognition of an input image, in response to a failure of a verification of the input image after a success of the object recognition of the input image, and perform an additional verification of the target image in response to the target image being verified in the verifying of the target image.

19 Claims, 9 Drawing Sheets

(56) References Cited

U.S. PATENT DOCUMENTS

| | | | |
|---|---|---|---|
| 2016/0379072 A1* | 12/2016 | Fan | G06T 7/00 |
| | | | 382/118 |
| 2017/0024608 A1* | 1/2017 | Kons | G06K 9/6215 |
| 2017/0098118 A1* | 4/2017 | Apelbaum | G06V 40/166 |
| 2017/0169304 A1* | 6/2017 | Jia | G06V 40/45 |
| 2017/0185872 A1* | 6/2017 | Chakraborty | G06K 9/6267 |
| 2018/0060648 A1* | 3/2018 | Yoo | G06V 40/172 |
| 2018/0276454 A1* | 9/2018 | Han | G06V 40/171 |
| 2018/0276488 A1* | 9/2018 | Yoo | G06V 40/169 |
| 2018/0276489 A1* | 9/2018 | Xu | G06V 40/167 |
| 2018/0285628 A1* | 10/2018 | Son | G06V 40/167 |
| 2018/0285629 A1* | 10/2018 | Son | G06V 40/171 |
| 2018/0285630 A1* | 10/2018 | Han | G06V 10/454 |
| 2018/0373924 A1* | 12/2018 | Yoo | G06K 9/6262 |
| 2019/0065875 A1* | 2/2019 | Sheikh Faridul | G06V 40/166 |
| 2019/0018851 A1 | 6/2019 | Han et al. | |
| 2019/0188510 A1* | 6/2019 | Han | G06V 40/172 |
| 2019/0197331 A1* | 6/2019 | Kwak | G06F 16/583 |
| 2019/0251334 A1* | 8/2019 | Kawase | G06V 10/145 |
| 2019/0251380 A1* | 8/2019 | Park | G06K 9/6228 |
| 2019/0332851 A1* | 10/2019 | Han | G06V 40/166 |
| 2019/0335098 A1* | 10/2019 | Guo | G06V 40/16 |

FOREIGN PATENT DOCUMENTS

| | | |
|---|---|---|
| CN | 104284240 A | 1/2015 |
| CN | 106330837 A | 1/2017 |
| EP | 3 168 781 A1 | 5/2017 |
| KR | 10-2006-0032247 A | 4/2006 |
| KR | 10-2011-0102073 A | 9/2011 |

OTHER PUBLICATIONS

Yang J., "Learn Convolutional Neural Network for Face Anti-Spoofing", *arXiv preprint arXiv*, Aug. 2014, pp. 1-8 (8 pages in English).

Alotaibi, A., "Deep Face Liveness Detection Based on Nonlinear Diffusion Using Convolution Neural Network", *Signal, Image and Video Processing*, May 2017, pp. 713-720 (7 pages in English).

Extended European Search Report dated May 15, 2019 in corresponding European Patent Application No. 18210386.1 (4 pages in English).

* cited by examiner

100

OBJECT RECOGNITION METHOD AND APPARATUS

CROSS-REFERENCE TO RELATED APPLICATIONS

This application is a continuation of U.S. patent application Ser. No. 16/176,440 filed on Oct. 31, 2018 which claims the benefit under 35 USC § 119(a) of Korean Patent Application No. 10-2017-0173573, filed on Dec. 15, 2017, in the Korean Intellectual Property Office, the entire disclosures of which are all incorporated herein by reference for all purposes.

BACKGROUND

1. Field

The following description relates to an object recognition apparatus and method.

2. Description of Related Art

A face verification technology is a biometric authentication technology and may be used to determine whether a user is legitimate, such as based on a face included in a still image or moving image. Using the face verification technology, an identity of a target for authentication may be verified without the target having to physically contact the device implementing the verification, such as through entry of identification or password information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented object recognition method includes verifying a target image using an object model and based on reference intermediate data previously extracted by a partial layer of the object model as used in an object recognition of an input image, in response to a failure of a verification of the input image after a success of the object recognition of the input image, and performing an additional verification, of the target image, in response to the target image being verified in the verifying of the target image.

The verification of the input image and the additional verification may be respective liveness verification operations performed using a liveness model.

The object recognition of the input image may be a registration based recognition, and, upon the target image being verified in the verifying of the target image, identification of the target image may be performed without performing registration based recognition of the target image.

Upon failure of the verifying of the target image, registration based recognition of the target image may be performed.

The object recognition of the input image may be registration based recognition, and, upon the target image being verified in the verifying of the target image, the additional verification of the target image may be performed without registration based recognition of the target image having been performed.

The verifying of the target image may include determining, based on the reference intermediate data, whether an object indicated by the target image is identical to an object indicated by the input image.

The verifying of the target image may include determining whether target intermediate data extracted by a partial layer of the object model used in the verifying of the target image matches the reference intermediate data, with the partial layer of the object model used in the verifying of the target image having a same layer intermediacy as the partial layer of the object model used in the object recognition of the input image.

The determining of whether the target intermediate data matches the reference intermediate data may include calculating a matching score between the target intermediate data and the reference intermediate data, and determining that the target image includes a same object as the input image in response to the matching score exceeding a predetermined threshold.

The performing of the additional verification of the target image may include determining whether the target image has determined sufficient liveness characteristics to indicate that an object included in the target image is a live body.

The determining of whether the target image has the determined sufficient liveness characteristics may include calculating a liveness score of the target image using a liveness model, and determining that the target image has the sufficient liveness characteristics in response to the liveness score exceeding a predetermined liveness threshold.

The method may further include acquiring an object image including a plurality of frames, with the target image and the input image being select frames of the object image, and performing the object recognition of the input image.

The method may further include performing the verification of the input image in response to the success of the object recognition of the input image.

The performing of the object recognition of the input image may include extracting reference output data from the input image through the use of the object model in the object recognition of the input image, and determining that the input image is identified in response to a determination that registration data matching the reference output data exists in a registration database (DB).

The determining that the input image is identified may include calculating a matching score between the reference output data and the registration data, and determining that an object of the input image is identical to an object of the registration data in response to the matching score exceeding an output threshold.

The method may further include, during the performing of the object recognition of the input image, storing the reference intermediate data extracted by the partial layer of the object model used in the object recognition of the input image.

The verifying of the target image may include, in response to a failure of the verifying of the target image, calculating target output data, for the target image, as a result of a completion of an object recognition of the target image that further uses the object model used in the verifying of the target image, and determining that the target image is identified in response to a determination that registration data matching the calculated target output data exists in a registration DB.

The method may further include, in response to a determination that the calculated target output data does not match registration data in the registration DB, acquiring a new object image and performing an object recognition of a corresponding input image of the new object image.

The target image and the input image may be select frames of an object image, and the verifying of the target image may include selecting, as the target image, a frame of the object image subsequent to the input image.

The verifying of the target image may include comparing target intermediate data extracted from the target image by an m-th layer among "n" total layers included in the object model used in the verifying of the target image to the reference intermediate data, the reference intermediate data being extracted from the input image by the m-th layer in the object model used in the object recognition of the input image, wherein n is an integer greater than "1" and m is an integer greater than "0" and less than "n."

The method may further include selecting an integer value of m based on analysis of the input image, the target image, or an object image that includes a series of frames from which the input image and the target image are acquired.

The method may further include determining that the object recognition of the input image succeeds in response to a determination that a matching score, between predetermined registration data and reference output data extracted from the input image by the object model used in the object recognition of the input image, exceeds an output threshold, where the verifying of the target image may include determining whether another matching score between the reference intermediate data and target intermediate data extracted from the target image by the object model used in the verifying of the target image exceeds an intermediate threshold, and where the intermediate threshold may be greater than the output threshold.

The method may further include acquiring a new object image in response to a failure of the object recognition of the input image, where the input image and the target image may correspond to respective frames of a plurality of frames included in a previously acquired object image.

The method may further include extracting target intermediate data, of another target image, based on a partial layer of the object model as used in a corresponding verification of the other target image in response to a failure of the additional verification of the target image, where the other target image may be an image corresponding to a frame subsequent to the target image, and where the corresponding verification of the other target image includes verifying the other target image based on the target intermediate data and the reference intermediate data.

In a general aspect, provided is a non-transitory computer-readable storage medium storing instructions that, when executed by a processor, cause the processor to perform any or any combination or all operations described herein.

In a general aspect, an apparatus with object recognition includes a memory configured to store an object model, and a processor configured to verify a target image using the object model and based on reference intermediate data previously extracted by a partial layer of the object model as used in an object recognition of an input image, in response to a failure of a verification of the input image after a success of the object recognition of the input image, and perform an additional verification, of the target image, in response to the target image being verified in the verifying of the target image.

In a general aspect, an apparatus with object recognition includes a processor configured to implement a primary recognition operation that implements all recognition layers of an object neural network model to perform recognition of an input image of an object image, implement a secondary recognition operation that selectively implements less than all recognition layers of the object neural network model to perform recognition of a target input image of the object image, and perform a liveness test of the target image.

The processor may be further configured to determine that the object image is recognized when the liveness test indicates that the target image is a live image and both of the primary recognition operation and the secondary recognition operation successfully indicate identification of the object.

The implementing of the primary recognition operation and the implementing of the secondary recognition operation may be performed in parallel.

The processor may be further configured to perform a liveness test of the input image upon a determined success of the primary recognition operation, where the secondary recognition operation and the performing of the liveness test of the target image may be performed only when the liveness test of the input image fails.

The performing of the liveness test of the target image may be performed only after the secondary recognition operation succeeds in the recognition of the target input image.

For the implementing of the secondary recognition operation, the processor may be configured to selectively implement the less than all recognition layers of the object neural network model based on a result of a comparison of an intermediate layer feature of the object neural network model performing the primary recognition operation and a corresponding intermediate layer feature of the object neural network model performing the secondary recognition operation.

The liveness test of the target image may be immediately performed upon the comparison indicating that the intermediate layer feature of the object neural network model performing the primary recognition operation is sufficiently similar to the intermediate layer feature of the object neural network model performing the secondary recognition operation.

The sufficient similarity may be based on a predetermined similarity threshold.

Other features and aspects will be apparent from the following detailed description, the drawings, and the claims.

Figure 1:
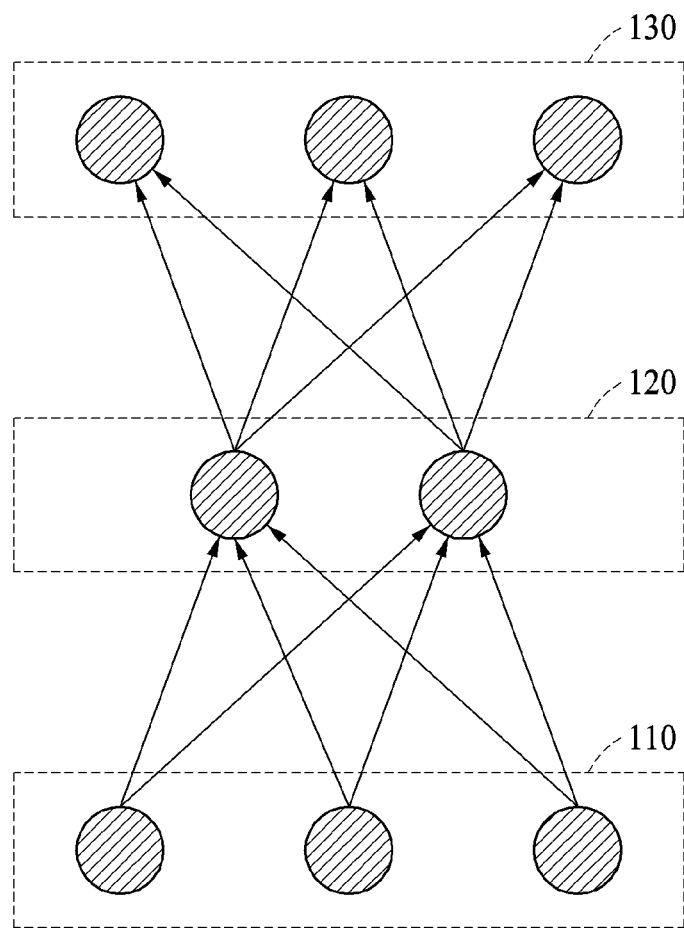
FIG. 1 illustrates an example of a model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions are examples to merely describe the examples, and the scope of the examples is not limited to the descriptions provided in the present specification.

As used herein, the singular forms are intended to include the plural forms as well, unless the context clearly indicates otherwise. It should be further understood that the terms "comprises" and/or "comprising," when used in this specification, specify the presence of stated features, integers, operations, elements, components or a combination thereof, but do not preclude the presence or addition of one or more other features, integers, operations, elements, components, and/or groups thereof.

Unless otherwise defined herein, all terms used herein including technical or scientific terms have the same meanings as those generally understood after an understanding of the disclosure of the present application. Terms defined in dictionaries generally used should be construed to have meanings matching with contextual meanings in the related art and the disclosure of the present application and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 illustrates an example of a model.

The model includes, for example, a neural network 100. A method of performing an object recognition based on the neural network 100 and an apparatus (hereinafter, referred to as an "object recognition apparatus") for recognizing an object based on the neural network 100 by performing the method are provided, and a method and an apparatus (hereinafter, referred to as an "object training apparatus") for training the neural network 100 are also provided. In the following description, a recognition operation includes a verification and an identification. The verification is an operation of determining whether input data is true or false, and the identification is an operation of determining which one of a plurality of labels is indicated by input data.

The neural network 100 includes a plurality of layers that each include a plurality of nodes. Also, the neural network 100 includes connection weights or connection intensities that connect, or provide corresponding weighted connections between, a plurality of nodes included in one of the plurality of layers to nodes included in another layer of the plurality of layers, and may further include connection weights that connect nodes within any layer with other nodes within the same layer and/or connection weights that connect nodes to themselves at different times. For example, when performing recognition and/or verification the object recognition apparatus may acquire the respective neural network(s) 100 from an internal database (DB) stored in a memory, or request, receive, or update the neural network 100 from an external server via a communicator and acquire the neural network 100. The neural network 100 may also be trained by the object training apparatus, which as explained below through substantial computational connection weight and architectural adjustments generates the trained neural network 100, which can thus then be stored in such an internal DB or other memory for such provision from the external server to the object recognition apparatus for use in object recognition and of the object recognition apparatus. The training may further include training the neural network 100 or another neural network 100 for the verification, e.g., for liveness detection. In an example, the object training apparatus and the object recognition apparatus may also be the same apparatus, or in other examples they are separate apparatuses.

As an example, the neural network 100 may be a specialized computational architecture recognition and/or liveness model that, when implemented, performs a series of computationally intensive processes based on the trained objective(s) of the neural network 100. The neural network 100 is implemented by, for example, through one or more processors of the object recognition apparatus or the object training apparatus, which after acquiring the parameters of the neural network 100, implement the neural network 100 through hardware or a combination of hardware and software, e.g., through instructions stored in a memory of the object recognition apparatus or the object training apparatus, which when executed by the corresponding one or more processors, cause the one or more processors to implement the recognition and/or liveness model.

As noted above, the neural network 100 includes a plurality of layers. For example, the neural network 100 includes one or more input layers 110, plural hidden layers 120 and one or more output layers 130. Here, though the hidden layers 120 are illustrated as a single layer, this illustration is for explanatory purposes, and thus the illustrated hidden layer 120 is intended to be representative of one or plural hidden layers. Similarly, the input layer 110 and output layer 130 are respectively representative of one or more layers. For example, there may be plural input layers that may connect to respective next hidden layers, which may ultimately connect to a single hidden layer, and there may be plural output layers that may connect to a single hidden layer or respectively to plural hidden layers. Thus, the input layer 110 receives an input for performing training or recognition and/or liveness, and transfers the input to the hidden layer 120, then each of the hidden layers 120 may be configured for different objectives or the number of hidden layers may be selected after varied architectures and desired efficiencies, and thus each hidden layer 120 generates respective outputs that are then input to the next hidden layer 120. The output layer 130 then generate an output of the neural network 100 based on a signal received from final hidden layer(s) 120. During training, the parameters (e.g., the connection weights) of the hidden layers 120 are repeatedly adjusted or changed based on training input of training data received via the input layer 110 until the output layer outputs a sufficiently accurate value or label that is relatively more easily predictable or useful for the objective of the neural network 100. Similarly, during recognition/liveness or other inference operations, real world image data may be provided to the input layer 110 and the respective hidden layers will each perform respective computational operations, e.g., through respective activation functions of the respective nodes, until the output layer 130 generates an output that includes information that can be used to indicate the result of the recognition/liveness or other inference operation for the input image data.

As noted, each of the input layer 110, the hidden layer 120 and the output layer 130 includes a plurality of nodes. A node included in the input layer 110 is referred to as an "input node," a node included in the hidden layer 120 is referred to as a "hidden node," and a node included in the output layer 130 is referred to as an "output node." As also noted, all or at least the hidden and output layer nodes may each apply respective predetermined activation functions, which may impart a non-linearity to the implementation of the neural network 100, for example.

In an example, select or all input nodes included in the input layer 110 are connected to select or each of the hidden nodes included in an example first or subsequent hidden layer 120, e.g., with such layers being connected to each other via edges through respective connection weights. Here, such sequential relatedness of the input layer 110 and the first or subsequent hidden layer 120 may also be referred to as operations of a lower depth or layer of the neural network 100, while operations that occur further between subsequent hidden layers 120 may be referred as operations that occur in a middle or higher depth or layer of the neural network 100, and operation that occur at a final hidden layer 120 prior to the output layer 130 may be referred to as operation that occur at the highest hidden depth or layer of the neural network 100. Similarly, operations that occur at the lower depths or layers than one of the hidden layers, or a set of hidden layers, may include one or more or all of those hidden layers 120 previous to the one hidden layer or the set of hidden layers, i.e., in view of the processing sequencing of the neural network during recognition/liveness or other inference operations. Also, as noted above, hidden nodes included in a final or highest hidden layer 120 and output nodes included in the output layer 130 are connected to each other via edges through connection weights.

The neural network 100 including the plurality of hidden layers may be a deep neural network (DNN) or include DNN portions. Further, as non-limiting examples, the neural network 100 may include convolutional, pooling, de-convolution, de-pooling, recurrent, bi-directional, or fully connected one or more portions that may be respectively trained for different objectives. For example, the neural network 100 may have lower hidden layers 120 that include convolutional layer(s) that may extract feature vectors or maps trained for an identification objective, and also include subsequent or higher hidden layers 120 that include additional convolutional and/or fully connected hidden layers 120 that may extract labels or probabilistic information with respect to the extracted feature vectors or maps for a liveness test objective. In another example, a first neural network 100 may be configured with several such hidden layers 120 that include convolutional layer(s) that may respectively extract feature vectors or maps trained for an identification objective and/or fully connected hidden layers 120 that may extract labels or probabilistic information with respect to the extracted feature vectors or maps for a recognition or identification objective, while a second neural network 100 may be configured with several such hidden layers 120 that include convolutional layer(s) that may respectively extract feature vectors or maps trained for aspects of a liveness objective and/or fully connected hidden layers 120 that may extract labels or probabilistic information with respect to the extracted feature vectors or maps for the liveness objective. Also, in one or more examples, any of the layers may include long short term memory (LSTM) nodes. Training of a neural network with multiple hidden layers is referred to as "deep learning." For example, when the hidden layers 120 include a first hidden layer, a second hidden layer, and a third hidden layer, an output of a hidden node included in the first hidden layer is connected to hidden nodes included in the second hidden layer. Also, an output of a hidden node included in the second hidden layer is connected to hidden nodes included in the third hidden layer, etc., as explained above.

Thus, in an example, the object recognition apparatus inputs respective outputs of previous hidden nodes included in a previous hidden layer to each subsequent hidden layer via edges with connection weights, and generates outputs of hidden nodes included in each hidden layer based on the respective activation functions and values to which connection weights are applied to the outputs of the previous hidden nodes. In an example, if a result of an activation function does not exceed a minimum threshold for a current hidden node, then the result of that activation function may not be transmitted to the higher level hidden node. In this example, a node may not transmit a signal to a next node until reaching a predetermined threshold activation strength through input vectors, and thus may otherwise remain in an inactive state. In an example, a padding value or zero value may alternatively be reflected instead of transmitting the result to the next node if the threshold is not met, or merely the corresponding example multiplication operations for the corresponding connection weights that would have been performed for that result for provision to the respective higher hidden layer nodes may not be performed.

The object training apparatus may generate or trains the neural network 100 through supervised learning. The object training apparatus is implemented by, for example, hardware or a combination of hardware and software, such as discussed above through executed instructions by one or more processors of the object training apparatus. The supervised learning is a scheme of inputting, to a neural network, a training input of training data together with a training output corresponding to the training input and updating connection weights of edges so that output data corresponding to the training output is accurately output, e.g., based upon a known label or aspect of the training input. For example, the training data may be respective data including a pair of a training input and a known or desired training output. Although the structure of the neural network 100 is shown based on nodes in FIG. 1, examples are not limited thereto. For example, various data structures may be used to store the neural network 100 in a storage or memory of the object training apparatus and/or the object recognition apparatus. The various data structures may include storing the resulting trained parameters, e.g., including the resulting trained connection weights, in vector, matrix, volume, or other single or multi-dimensional data structure.

In the training, the object training apparatus determines the parameters for the nodes included in a temporary neural network through a gradient descent scheme based on an error for the training data that is propagated backwards to the temporary neural network and based on output values of the nodes. For example, initial values of the connection weights of the temporary neural network may be determined, and then training performed on the temporary neural network with the initial connection weight values. For example, in the training, the object training apparatus adjusts and updates the connection weights between the various nodes of the many layers through respective error backpropagation learning. The error backpropagation learning is a scheme of estimating an error by a forward computation of given training data, propagating the estimated error backwards from an output layer to a hidden layer and an input layer, and updating connection weights to reduce an error. Similar to the neural network 100 during inference operations, the temporary neural network is processed in an order of the input layer 110, the hidden layer 120 and the output layer 130, however, connection weights in the error backpropagation learning are updated in the temporary neural network in an order of the output layer 130, the hidden layer 120 and the input layer 110. For example, at least one processor uses a buffer memory configured to store layers or calculation data to process the temporarily neural network in a desired order.

The object training apparatus defines an objective function to measure how close currently set connection weights of the temporary neural network are to an optimal value, continues to adjust or change the connection weights based on a result of the objective function, and repeatedly performs training of the temporary neural network. For example, the objective function is a loss function used to calculate a loss between an expected value to be output and an actual output value based on a training input of training data in the temporary neural network. The object training apparatus updates the connection weights by reducing a value of the loss function. Here, though these training operations of FIG. 1 have been discussed with respect to such a temporary neural network, the below discussions of such training by object training apparatus examples will be discussed from the perspective of the training of the neural network 100. For example, such trainings of or for the neural network 100 below refer to such temporary neural network(s) that result from each iteration of adjusting or changing of the parameters for the temporary neural network until a final temporary neural network is determined to have been trained to sufficient accuracy or sufficient minimal error to determine to cease the training and to determine to store the final temporary neural network as the trained neural network 100. Also, as non-limiting examples, for the recognition or identification training, the training data for a corresponding neural network 100 may include image data or information thereof. Similarly, as non-limiting examples, for the liveness training the training data for the/a corresponding neural network 100 may further or also be image data or feature data extracted from such image data. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Figure 2:
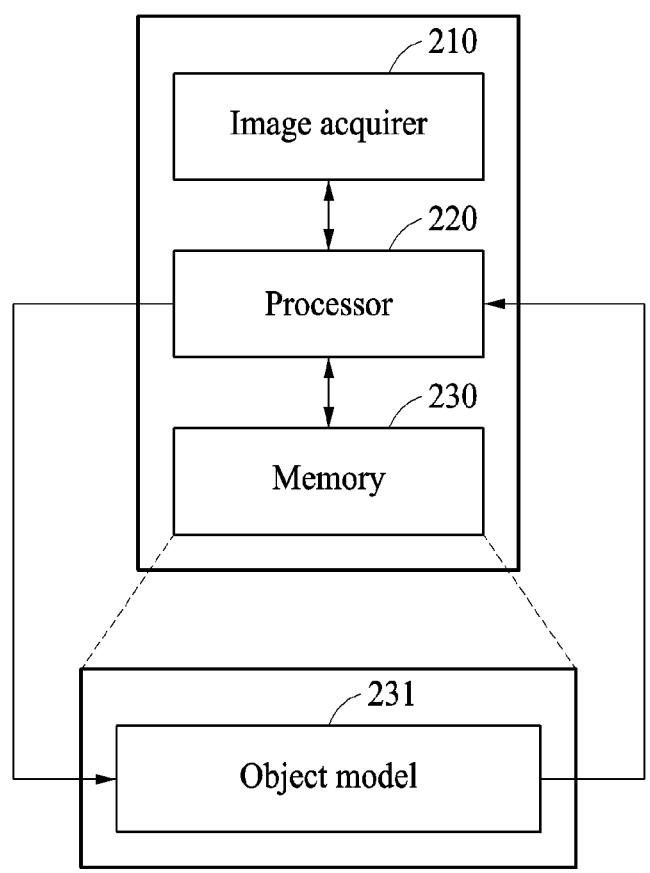
FIG. 2 is a block diagram illustrating an example of a configuration of an object recognition apparatus.

FIG. 2 is a block diagram illustrating an example of a configuration of an object recognition apparatus 200.

Referring to FIG. 2, the object recognition apparatus 200 includes an image acquirer 210, a processor 220 and a memory 230.

The image acquirer 210 acquires an object image. For example, the image acquirer 210 includes a camera, and generates an object image by capturing an object. The object image includes, for example, an image corresponding to a plurality of captured frames associated with an arbitrary object. A series of images corresponding to a plurality of frames may be generated in a time sequence of capturing an object, for example. Also, the image acquirer 210 is not limited thereto to the capturing of such color images, and the image acquirer 210 may alternatively or additionally acquire a depth image. For example, image acquirer 210 may be representative of one or more cameras that are configured to capture color and depth images or representative of one or more color image cameras and one or more depth image cameras.

In the present disclosure, an object image is an image acquired by capturing at least a portion of an object. For example, an object may be a human, and an object image may be an image acquired by capturing a face of the human as at least a portion of the object, however, examples are not limited thereto.

The processor 220 selects an input image from the object image, and performs an object recognition of the input image. For example, the processor 220 performs object recognition to determine whether an object appearing in the input image is registered in a registration DB based on the results of the object recognition. The processor 220 may recognize an input image corresponding to one frame from the object image based on a pre-trained object model 231. For example, the object model may correspond to the neural network 100 model of FIG. 1. The processor 220 extracts the example feature data by inputting an image to the object model 231 and by the object model 231 generating or extracting the feature data. The processor 220 may then recognize an image based on the extracted feature data, such as by comparing the extracted feature data to predetermined registration information. When the object is determined not to be registered or not sufficiently match such registration information, the processor 220 determines that the object recognition fails. When the object recognition succeeds (for example, when the object is determined to be registered or sufficiently match such registration information), the processor 220 performs an additional verification operation for the input image.

The additional verification may be a liveness test operation of determining whether the captured object is forgery or fake image of a user or human, e.g., a non-live image. For example, the additional verification may include an operation of verifying whether an image has characteristics that demonstrate a liveness of the captured image. The liveness indicates whether an object is an actual living body. For example, the liveness may be determined based on liveness parameters determined for each frame of an object image. Thus, a liveness parameter may indicate whether each frame is based on an image acquired by effectively capturing a real user. For example, a liveness parameter may be "true" in response to an image corresponding to an arbitrary frame being acquired by capturing a real user, and may be "false" in response to the image being a forger or fake. The liveness test operation may be performed by a liveness model, e.g., the liveness model may correspond another neural network 100 model of FIG. 1 or a subsequent portion of the neural network 100 that includes the recognition model.

When the additional verification succeeds, the processor 220 determines that the object recognition finally succeeds. For example, if the object has already been recognized in the object recognition operation, when the object image is further determined to have a true liveness parameter or the liveness test is successful, the processor 220 may fully or finally approve an object recognized from the object image. In this example, a full object recognition may thus include two determinations, the first being whether the object is recognized or identified in the object recognition operation, and the second being whether a liveness test is successful in the additional verification operation.

When the additional verification fails, the processor 220 may repeat the object recognition, e.g., for a next captured target image or corresponding to a different frame from the previous input image. In this example, depending on a verification analyses of the example target image, the processor 220 may select to perform a simplified object recognition in comparison to the above "full" object recognition operation performed for the previous image. For example, when the additional verification of the liveness of the previous input image has failed, the processor 220 may initiate performance of recognition/identification analyses of the target image. During this analyses, the processor 220 may perform a verification analyses that compares the input image and the target image based on generated features or feature information within a portion of the object model 231. For example, in the above example neural network 100 as the recognition model, a result of nodes of a lower hidden layer 120 may produce respective information or results that is set to be provided or connected to nodes of the subsequent or higher hidden layer 120. In the context of this verification analyses, the lower hidden layer 120 may also be referred to as a "partial layer", e.g., as representing hidden layer results corresponding to a portion of the overall neural network operation in the performance of the recognition/identification analyses. In an example, such information of/by the partial layer may be in the form of feature vectors or feature maps, though examples are not limited thereto. Thus, if such results from such a lower hidden layer for the previous input image are determined or verified to be sufficiently similar, e.g., based on a predetermined threshold, to results of the same hidden layer for the target image input to the same object model, then the target image may be determined or verified to be similar or of the same object as the previous input image. For example, in response to the determination or verification that the same object is indicated by the input image and the target image based on such a comparison result, the processor 220 may skip or not further perform the remaining subsequent hidden layer operations of the object model for the target image, e.g., cease the performance of the recognition/identification analyses, and immediately perform the additional verification of the target image. As a non-limiting example, upon such a skip determination, the processor 220 may determine the result of the recognition/identification of the target image to be the same as the recognition/identification result of the input image, and immediately input the target image to the liveness test model to perform the additional verification of the target image. As an alternative, while the recognition is being at least partially performed for the target image, the liveness test may also be simultaneously performed with respect to the target image. In this example, if the skip determination is made, then the liveness test of the target image may continue until a result of the liveness test is generated, while if the skip determination is not made, then the remaining recognition hidden layer operations may be performed for the target image, and if the recognition result is a failure, e.g., no registration information is found to correspond to the target image, before completion of the liveness test of the target image the liveness test may be caused to cease before completion. In both such examples, the recognition and liveness test operations of the target image may be substantially quicker than if the full recognition and liveness test operations were performed without skip determination considerations. Accordingly, in this example, when the verification analyses of the target image indicate that the target image includes the same object as the input image the recognition or identification may immediately be approved, and the processor 220 may finally recognize the object in the target image when the additional verification of the target image is determined successful.

As noted above, the partial layer outputs or produces informational results, for example, that may represent respective extracted feature(s) of the previous input image and the target image corresponding to a relatively low level of the object model, where remaining or subsequent layers may output or produce informational feature results corresponding to relatively higher levels in comparison to the partial layer. For example, for an image input to the object model, a feature represented in results of a relatively high level of the object model would be a feature that is more abstracted than a feature represented in results of a relatively low level of the object model.

The memory 230 stores the above-described object model 231 and a liveness test model. Also, the memory 230 temporarily or permanently stores the object image, the input image, the target image, the aforementioned output or results of the partial layer for the input image and/or the target image, an output of the object model 231 for the input image, and any otherwise generated or produced information used for or during the respective object recognition and/or additional verification operations.

Figure 3:
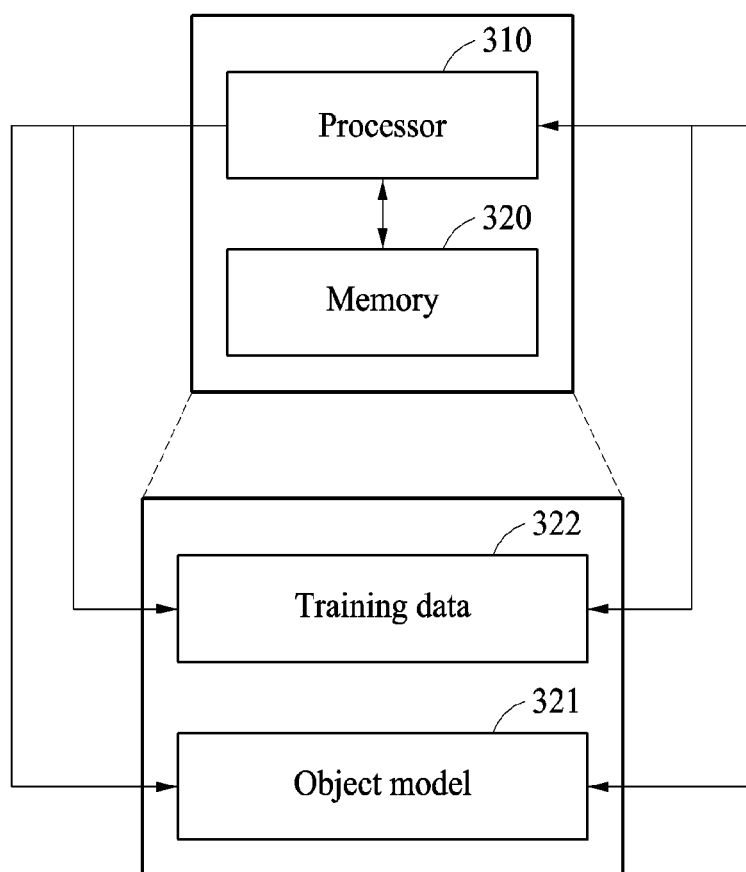
FIG. 3 illustrates an example of an object recognition training apparatus.

FIG. 3 illustrates an example of an object recognition training apparatus.

Referring to FIG. 3, a training apparatus 300 trains an object model 321 that is used in an object recognition apparatus. The training apparatus 300 includes a processor 310 and a memory 320.

The processor 310 trains the object model 321 based on training data 322. The training data 322 includes a pair of a training input and a training output. The training input is, for example, a training image. The training output is, for example, an object label provided for an arbitrary training image. The object label is a label indicating an object in the training image, and includes, for example, an identity (ID) of a user.

The processor 310 trains the object model 321 so that the object model 321 outputs a particular or known training output in response to a particular training input. For example, during the training of the object model 321, the processor 310 minimizes a loss between the training output and an output calculated from the training input based on the object model 321. The processor 310 updates parameters of the object model 321 to minimize the loss between the training output and the output calculated from the training input, to train the object model 321. For example, the processor 310 may perform training of the object model corresponding to the above discussion of the training of the neural network 100 of FIG. 1. Additionally, or alternatively, the processor 310 may perform training of the liveness test model corresponding to the above discussion of the training of the neural network 100 of FIG. 1.

Figure 4:
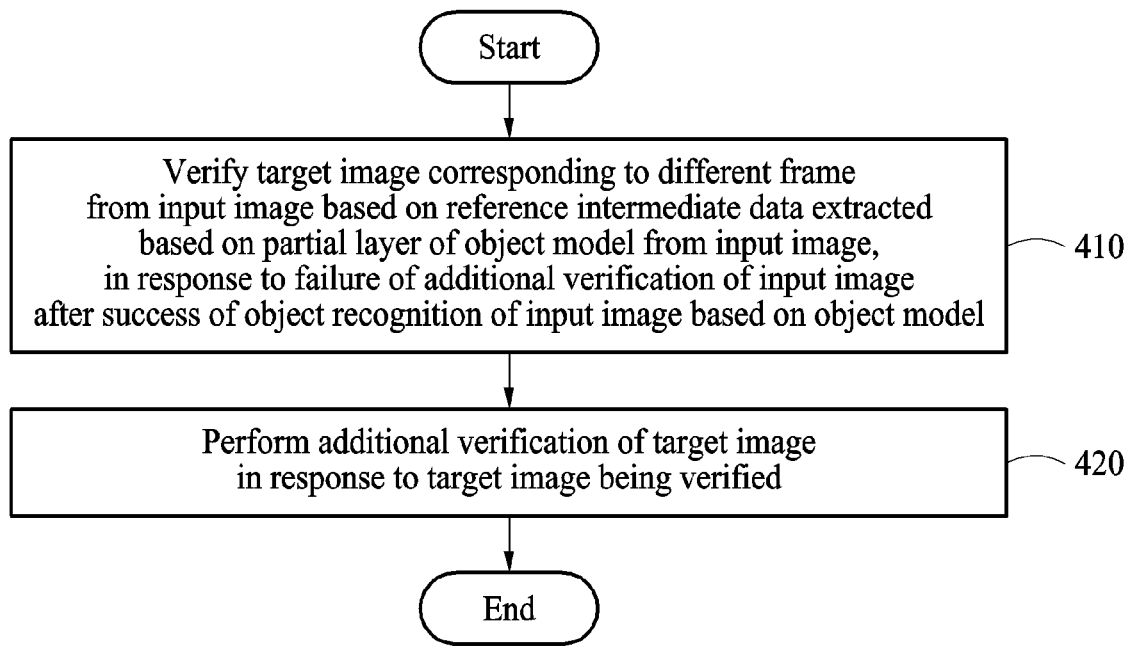
FIG. 4 is a flowchart illustrating an example of a method of recognizing an object.

FIG. 4 is a flowchart illustrating an example of a method of recognizing an object.

An object recognition apparatus recognizes an input image based on an object model. Similar to above, the object model may correspond to the neural network 100 of FIG. 1 and/or the respective object models of FIG. 2 and/or FIG. 3, noting that examples are not limited thereto. Also, such corresponding descriptions above with respect to recognition of an input image are also applicable to operations of FIG. 4. The object recognition apparatus extracts reference output data from the input image using the object model. In response to a determination that predetermined registration data, e.g., stored in a registration DB of the memory 320, matches the reference output data, the object recognition apparatus determines that the input image is identified. When the input image is thus identified or recognized, the object recognition apparatus performs an additional verification of the input image. For example, the object recognition apparatus determines whether the input image has a liveness or whether the input image passes a liveness test. If such a liveness test fails, for example, the object recognition apparatus determines, based on reference intermediate data, whether an object indicated by a subsequent target image is identical to, or sufficiently similar based on a predetermined threshold, an object indicated by the input image.

Thus, when the additional verification of a recognized object fails for the previous image input to the object model, the object recognition apparatus may perform a simplified recognition of the object for the subsequent target image. For example, referring to FIG. 4, in operation 410, the object recognition apparatus verifies the subsequent target image, e.g., corresponding to a different frame from the input image, based on reference intermediate data extracted based on a partial layer of the object model from the input image, in response to a failure of the additional verification or liveness test of the input image after a success of the object recognition of the input image using the object model input the input image.

In operation 420, the object recognition apparatus then performs the additional verification, e.g., the liveness test, of the target image in response to the target image being verified. For example, the object recognition apparatus determines whether the target image has a liveness indicating whether an object included in the target image is an actual living body.

The object recognition apparatus determines a liveness score of the target image based on a liveness test of the target image. For example, as the target image becomes more similar to a valid image acquired by capturing a real user, the liveness score may increase. Similarly, as the target image becomes less similar to a valid image, the liveness score may decrease. To prevent a predetermined frame in a fake image from being incorrectly determined to have a liveness, a liveness score of a current frame is determined based on at least one previous frame. For example, the liveness score of the target image is determined based on an accumulation of a first liveness score acquired based on a liveness test of a k-th frame and a second liveness score determined for an input image corresponding to a previous frame. In this example, k is an integer, and the input image corresponds to a (k−1)-th frame. Thus, in an example, a liveness lest performed of the target image may generate a liveness score for the target image based on the target image and the input image and/or further based on a liveness score generated in the liveness test of the input image.

The object recognition apparatus determines a liveness parameter by comparing the determined liveness score of the target image and a liveness threshold for the target image. For example, when the liveness score of the target image is greater than or equal to the liveness threshold, the object recognition apparatus determines a liveness parameter of the target image based on whether the target image has a liveness.

The object recognition apparatus adjusts a liveness threshold for a k-th frame based on an analysis result of the k-th frame. For example, when a size of a facial area of the k-th frame is out of an appropriate range, the object recognition apparatus determines the liveness threshold for the k-th frame to be high.

Also, the object recognition apparatus may calculate a liveness score of the target image based on a separate liveness model, such as discussed above with respect to FIG. 1. Thus, the above discussions with respect to the neural network 100 of FIG. 1 are also applicable to the liveness model. The liveness model may be, for example, another neural network 100 or another neural network portion of the object model from object recognition portions of the object model, and may be trained to output a training label in response to an input of a training image. The training label is, for example, a value indicating whether the training image has a liveness. In response to the liveness score exceeding a liveness threshold, the object recognition apparatus determines that the target image passes the liveness test or has the liveness, e.g., is a live image.

Figure 5:
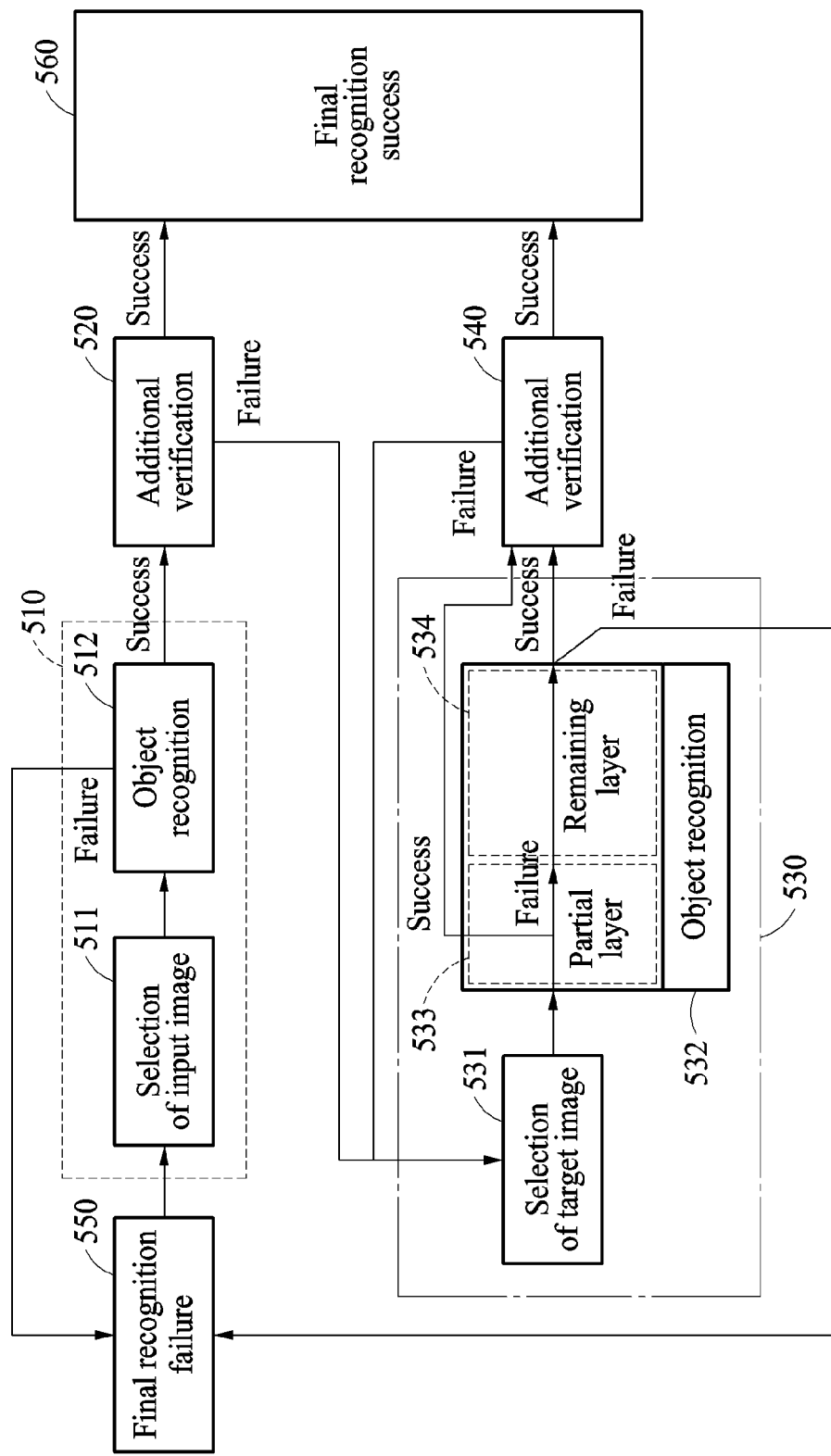
FIGS. 5, 6 and 7 illustrate examples of an object recognition process.
Figure 6:
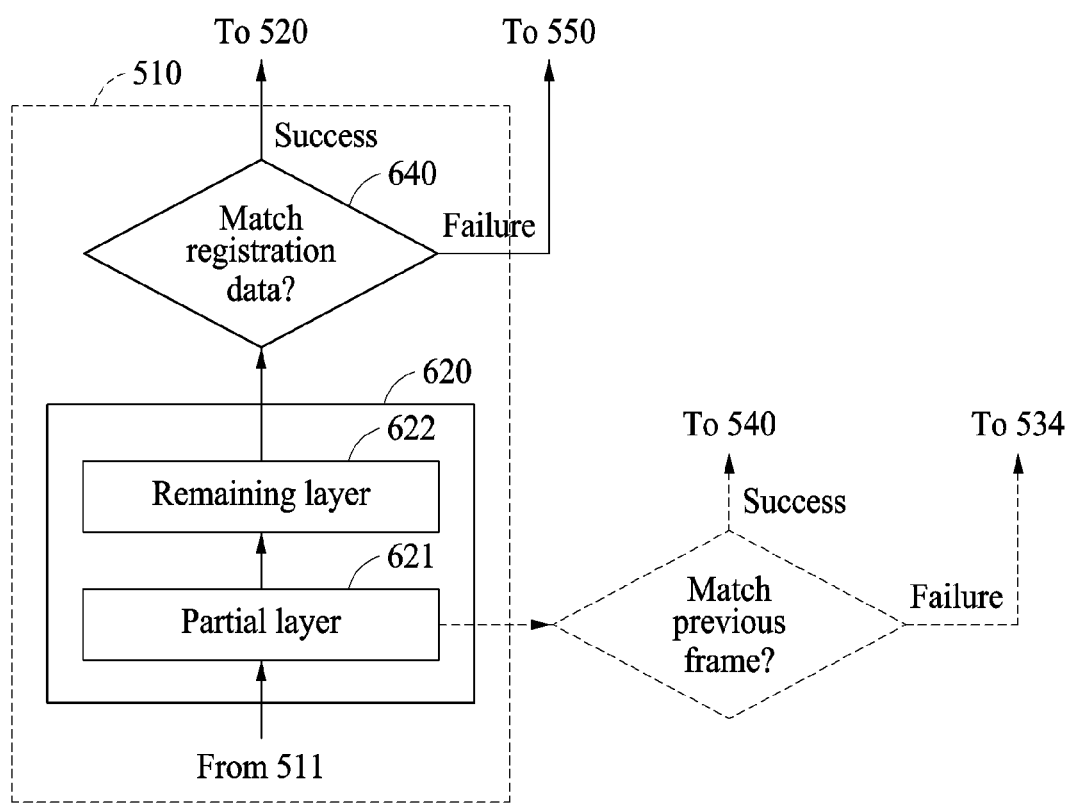
Figure 7:
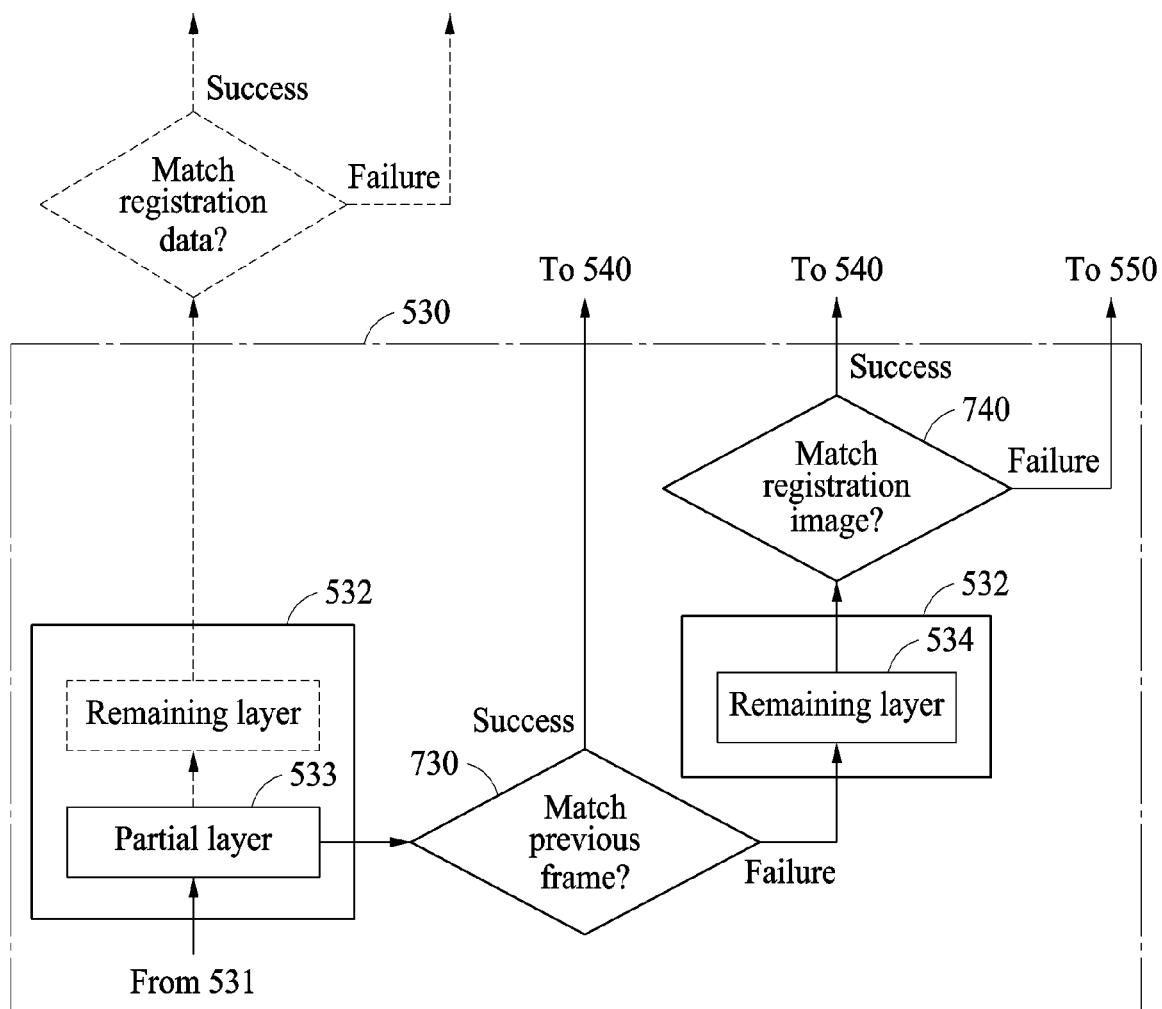

FIGS. 5, 6 and 7 illustrate examples of an object recognition process.

FIG. 5 illustrates an example of an object recognition process.

An object recognition apparatus acquires an object image including a plurality of frames. Referring to FIG. 5, the object recognition apparatus recognizes an object from an input image through a primary object recognition 510. When the primary object recognition 510 succeeds, the object recognition apparatus performs an additional verification 520 of the input image.

For example, in operation 511, the object recognition apparatus may select an input image from one of the frames from the object image. For example, the object recognition apparatus may select, as an input image, an image corresponding to a frame with a predetermined area to which at least a portion (for example, a face) of an object is properly fitted among the plurality of frames. The selection of the input image may further include image processing, such as face detection, resizing, cropping, etc.

The object recognition apparatus performs an object recognition 512 of the input image. When the object recognition 512 fails, the object recognition apparatus may immediately or finally determine that the recognition fails in operation 550.

When the object recognition 512 succeeds, the object recognition apparatus may then perform the additional verification 520. For example, the object recognition apparatus determines whether the input image has a liveness, through the additional verification 520. For example, the additional verification 520 may include provision of the input image to a liveness model or provision of intermediate or partial results of the object model used in the primary object recognition 510, as non-limiting examples. When the input image is determined to have the liveness, the object recognition apparatus may immediately or finally determine that the recognition succeeds in operation 560.

When the additional verification 520 fails, the object recognition apparatus verifies a target image through a secondary object recognition 530.

For example, in operation 531, the object recognition apparatus selects a target image from another of the plural frames of the object image. Thus, the object recognition apparatus selects, as a target image, an image corresponding to a frame different from the frame corresponding to the input image. For example, the object recognition apparatus selects a frame subsequent to the frame corresponding to the input image, as a target image from the object image.

The object recognition apparatus initiates the performance of an object recognition 532 of the target image. For example, during the performance of the object recognition 532, the object recognition apparatus extracts target intermediate data from the target image based on partial layer(s) 533 of an object model. The object recognition apparatus verifies the target image based on a comparison between the target intermediate data and reference intermediate data that is extracted from the input image during the primary object recognition 510. In response to the target intermediate data being determined to match the reference intermediate data, the object recognition apparatus immediately determines that the target image is verified. For example, when the target intermediate data matches the reference intermediate data, the object recognition apparatus determines that a continuity between the target image and the input image exists.

As noted above, in the present disclosure, the reference intermediate data is feature data extracted based on the partial layer(s) 533 from the primary object recognition 510 of the input image. Also, the target intermediate data is feature data extracted based on the partial layer(s) 533 from the secondary object recognition 530 of the target image. Feature data is data obtained by abstracting an image, and includes, for example, data in a form of a feature vector or feature map, as non-limiting examples. Thus, an inferred continuity between a plurality of images may indicate that the plurality of images are associated with each other based on a series of frames. For example, a plurality of consecutive images include the same object.

For example, the object model used in the primary object recognition 510 and in the secondary object recognition 530 includes "n" layers, the partial layer may be the m-th layer, and the remaining layers of the object model may include an (m+1)-th layer through an n-th layer. In this example, "n" is an integer greater than or equal to "2," and "m" is an integer greater than "1" and less than "n." The object recognition apparatus compares target intermediate data extracted in the secondary object recognition 530 from a target image based on the m-th layer among the "n" layers of the object model to reference intermediate data extracted from the input image based on the m-th layer of the object model in the primary object recognition 510. Also, examples exist with various "m" values. Further, the object recognition apparatus may dynamically set or change "m" based on determined attribute information (for example, a determined number of pixels or a determined average brightness) of the object image, to determine which partial layer m is used to extract the reference intermediate data and the target intermediate data.

When a verification of the target image based on the partial layer 533 fails, i.e., when the comparison of the target intermediate data and the reference intermediate data indicates that the two data are not sufficiently similar or same, the object recognition apparatus continues to performs the identification of the target image based on the remaining layer(s) 534. For example, the object recognition apparatus generates target output data by propagating the target intermediate data output from the partial layer 533 to the next layer of the object model, i.e., to the remaining layer(s) 534. When registration data matching the target output data is then determined to exist, the object recognition apparatus determines that the target image is identified. In this example, when the verification fails, the full recognition or identification operation is thus ultimately performed similar to the primary object recognition 510. Rather, when verification of the target image succeeds, such registration based recognition operations may not be performed to identify the target image.

In the present disclosure, as examples, target output data may be output data of an object model that is finally calculated from a target image, and reference output data may be output data of an object model that is finally calculated from an input image.

When the identification of the target image based on the remaining layer(s) 534 fails, the object recognition apparatus may immediately and finally determine that the overall recognition fails in operation 550, e.g., without performing the additional verification 540. In an example, the object recognition apparatus may alternatively acquire a new object image and reperform the recognition on the new object image, e.g., the primary object recognition 510 may be performed on the new object image.

Either upon the verification of the target image based on the partial layer 533 succeeding, or upon the identification of the target image based on the remaining layer(s) 534 succeeding, the object recognition apparatus may subsequently perform the additional verification 540 of the target image. For example, the target image may be provided to a liveness test model, or intermediate or partial results of the object model used in the secondary object recognition 530 may be provided to the liveness test model, as non-limiting examples.

When the additional verification 540 succeeds, the object recognition apparatus may immediately and finally determine that the recognition succeeds in operation 560. When the additional verification 540 fails, the object recognition apparatus selects a new target image from the object image in operation 531, and the object recognition apparatus reperforms the secondary object recognition 530 and the additional verification 540 on the new target image depending on results of the reperformed secondary object recognition 530.

Thus, the failure of the additional verification 520 indicates a possibility that the input image is a fake image. In view of this probability, when the additional verification 520 fails, the object recognition apparatus identifies and verifies the target image through the secondary object recognition 530 and the additional verification 540. However, rather than having to implement the entire object model and additional verification for the target image, the object recognition apparatus may compare the target intermediate data extracted from the target image to the reference intermediate data extracted from the input image to selectively perform a simplified recognition, to reduce an amount of time used to identify the target image.

When the target image is determined to have a liveness, e.g., the additional verification 540 is successful, the object recognition apparatus determines that the input image also has a liveness, because the target image and the input image have been respectively selected from a series of object images and have been determined to be associated with each other. Thus, though the failure of the additional verification 520 indicates the probability of a captured forgery, the object recognition apparatus reperforms the additional verification for the identified target image, to more guarantee an accuracy of the recognition of the object image.

For convenience of description, the primary object recognition 510 and the secondary object recognition 530 are separately illustrated, however, the object recognition apparatus may perform the primary object recognition 510 and the secondary object recognition 530 sequentially using the same object model. For example, when the primary object recognition 510 using an object model is terminated, the object recognition apparatus performs the secondary object recognition 530 using the same object model as the object model.

However, the examples are not limited thereto. For example, the object recognition apparatus may simultaneously perform the primary object recognition 510 by inputting an input image to a first object model, and the secondary object recognition 530 by inputting a target image to a second object model, or simultaneously perform the additional verification 420 with the secondary object recognition 530. The second object model has the same parameter and the same structure of a machine learning model as those of the first object model. In this example, the object recognition apparatus extracts the reference intermediate data from the input image based on a partial layer of the first object model. When the reference intermediate data is extracted, the object recognition apparatus extracts target intermediate data from the target image based on the same partial layer of the second object model, and compares the same, before completion of the second object model, to determine whether the target image and the input image are sufficiently similar with respect to the captured object that the operation of the second object model can be ceased before full completion of the second object model, enabling the liveness test to be implemented substantially earlier for the target image than if the full second object model had been performed.

FIG. 6 illustrates an example of the primary object recognition 510.

Referring to FIG. 6, in operation 620, the object recognition apparatus calculates reference output data from an input image based on an object model that includes a partial layer 621 and a remaining layer(s) 622. The partial layer may be a single layer or two or more layers either immediately after an example input layer of a corresponding neural network, for example, or subsequent to other hidden layers after such an example input layer. The reference intermediate data and target intermediate data respectively from the partial layer may also include all nodal or activation results of the partial layer, such as of the neural network example, or less than all nodal or activation results. For example, the object recognition apparatus propagates data corresponding to the input image from the partial layer 621 to the next layer of the object model, i.e., the remaining layer 622(*s*), to ultimately calculate the reference output data. In this example, the object recognition apparatus stores reference intermediate data that is extracted from the input image based on the partial layer 621. For example, as noted above, the reference intermedia data may be a feature vector or feature map, as all or a select collection of nodal or activation results of the partial layer 621.

In the present disclosure, the partial layer 621 includes at least one layer, and the remaining layer 622 also includes at least one layer. Each layer includes a plurality of nodes, and a node of one layer is connected to a node of another layer via an edge with a connection weight. The object recognition apparatus propagates, via an edge, data that is input to a node of each layer. Thus, similar to the liveness model, the above discussions with respect to the neural network 100 of FIG. 1 are also applicable to the object model.

In operation 640, the object recognition apparatus determines whether the reference output data extracted based on the object model from the input image matches registration data. When registration data matching the reference output data exists, the object recognition apparatus determines that the input image is identified. For example, the object recognition apparatus determines that the input image indicates an object corresponding to the registration data.

The object recognition apparatus calculates a matching score between the reference output data and the registration data. In response to the matching score exceeding an output threshold, the object recognition apparatus determines that an object of the input image is identical to an object of the registration data. In an example, an intermediate or corresponding similarity threshold may also be set to be greater than the output threshold, because a higher accuracy may be desired for a comparison between outputs corresponding to intermediate layers.

FIG. 7 illustrates an example of the secondary object recognition 530.

Referring to FIG. 7, in an object recognition 532 of a target image, the object recognition apparatus extracts target intermediate data from the target image based on a partial layer 533 of an object model. For example, as noted above, the target intermedia data may be a feature vector or feature map, as all or a select collection of nodal or activation results of the partial layer 533.

In operation 730, the object recognition apparatus determines whether the target image matches a previous frame. Here, the object recognition apparatus determines whether the target image matches an input image (for example, a previous frame). For example, the object recognition apparatus determines whether the target intermediate data extracted from the target image based on the partial layer 533 matches reference intermediate data. The target image and the input image may respectively correspond to, for example, a k-th frame and a (k−1)-th frame.

In response to the target image being verified as result of the determined matching of the target image to the previous frame, the object recognition apparatus performs an additional verification 540 of the target image. For example, when the target image matches the input image, the object recognition apparatus performs the additional verification 540 of the target image.

When the determination indicates that the target image does not match the input image, the object recognition apparatus performs the object recognition 532 based on the remaining layer(s) 534. For example, the object recognition apparatus calculates target output data by propagating the target intermediate data output from the partial layer 533 to the next layer of the object model, i.e., to the remaining layer(s) 534.

In operation 740, the object recognition apparatus determines whether the target image matches a registration DB. The object recognition apparatus determines whether the target image matches at least one of registration images stored in the registration DB. For example, the object recognition apparatus determines whether the target output data matches registration data.

When the target image matches a registration image, the object recognition apparatus then performs the additional verification 540 of the target image.

However, when the target image does not match the registration image, the object recognition apparatus finally determines that a recognition fails in operation 550. In another example, the object recognition apparatus may then acquires a new object image and again perform object recognition for a new input image and potentially another target image.

Figure 8:
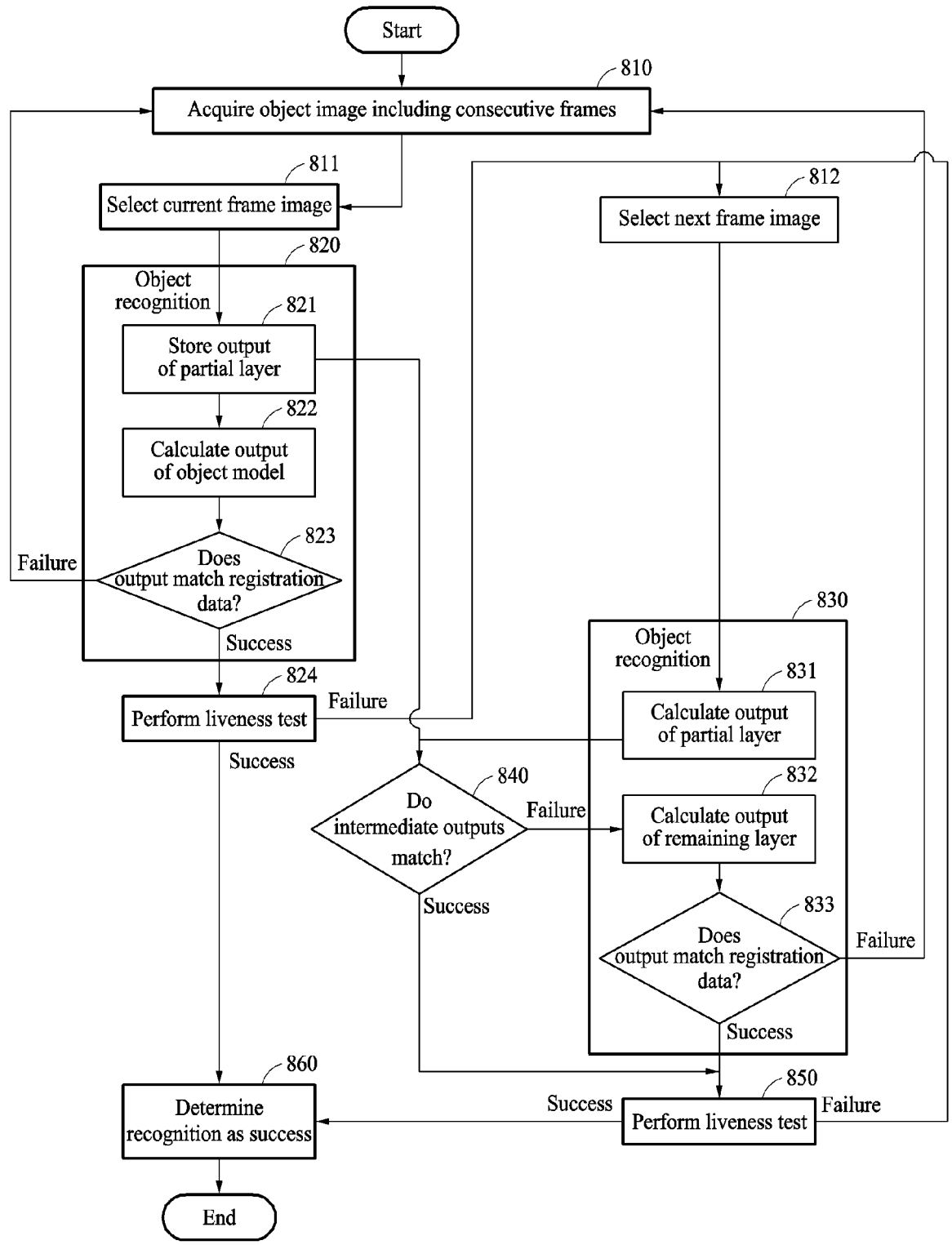
FIG. 8 is a flowchart illustrating an example of a process of recognizing an object.

FIG. 8 is a flowchart illustrating an example of a process of recognizing an object.

Referring to FIG. 8, in operation 810, an object recognition apparatus acquires an object image including consecutive frames. As non-limiting examples, the object image may be a video or a set of images sequentially captured in series.

In operation 811, the object recognition apparatus selects a current frame image as an input image. For example, the object recognition apparatus may select any one of the frames of the object image as the current frame.

In operation 820, the object recognition apparatus performs an object recognition of the input image using an object model. In operation 821, the object recognition apparatus stores an output of a partial layer of the object model with respect to the input image. An output based on the partial layer from the input image is, for example, reference intermediate data. In operation 822, the object recognition apparatus calculates an output of the object model with respect to the input image. An output based on the object model from the input image is, for example, reference output data. In operation 823, the object recognition apparatus determines whether the output based on the object model from the input image matches registration data stored in a registration DB.

For example, when registration data matching reference output data extracted from the input image based on the object model is not identified, the object recognition apparatus determines that an object recognition fails. In an example, in response to a failure of the recognition of the input image corresponding to any one of the plurality of frames included in the object image using the object model, the object recognition apparatus may acquire or capture a new object image, e.g., a new object image including consecutive frames.

In operation 824, the object recognition apparatus performs a liveness test of the input image. For example, the object recognition apparatus may input the input image to a liveness model and use the liveness model to determine whether the input image has a liveness, to determine whether the input image is a fake image.

When the liveness test succeeds, the object recognition apparatus determines that the overall recognition, e.g., registration based recognition and liveness determination, of the input image succeeds in operation 860.

When the liveness test fails after a success of the object recognition, the object recognition apparatus selects as a target image another or next frame image from the object image in operation 812. For example, the object recognition apparatus may determine, as the target image, an image corresponding to a frame immediately subsequent to the frame corresponding to the input image.

In operation 830, the object recognition apparatus performs object recognition of the target image using the object model. In operation 831, the object recognition apparatus calculates an output of the partial layer of the object model with respect to the target image. An output based on the partial layer from the target image is, for example, target intermediate data.

In operation 840, the object recognition apparatus determines whether the partial layer intermediate outputs of the input image and the target image match. For example, the object recognition apparatus determines whether the target intermediate data and the reference intermediate data match each other. The object recognition apparatus calculates a matching score between the target intermediate data and the reference intermediate data. As a non-limiting example, such a matching score may be based on a determined Euclidean distance between the target intermediate data and the reference intermediate data, such as where each of the target intermediate data and the reference intermediate data are represented by feature vectors or feature maps, as non-limiting examples. In response to the matching score exceeding an intermediate threshold, the object recognition apparatus determines that the target image includes the same object as the input image. The intermediate threshold may be variously set depending on a design.

In operation 832, the object recognition apparatus may selectively calculate an output of the remaining layer(s) of the object model with respect to the target image. For example, when a verification based on the reference intermediate data fails, the object recognition apparatus may select to perform the full registration based recognition using all layers of the object model to calculate target output data from the target image. In this example, the object recognition apparatus propagates the target intermediate data to next layer of the object model, i.e., to the remaining layer(s), and calculates the target output data based on the final output of the object model.

In operation 833, the object recognition apparatus determines whether an output associated with the target image matches registration data. For example, the object recognition apparatus retrieves registration data matching the target output data. When registration data matching the calculated target output data exists in a registration DB, the object recognition apparatus determines that the target image is identified.

When the object recognition of the target image succeeds, the object recognition apparatus performs a liveness test of the target image in operation 850. In an example, when the target intermediate data extracted from the target image matches the reference intermediate data extracted from the input image in operation 840, the object recognition apparatus immediately performs the liveness test of the target image. Rather, in the situation where the target intermediate data does not match the reference intermediate data, and when registration data matching the target output data extracted from the target image is determined to exist in operation 833, the object recognition apparatus then performs the liveness test of the target image.

For example, the object recognition apparatus calculates a liveness score of the target image, and determines whether the calculated liveness score exceeds a liveness threshold. In response to the liveness score exceeding the liveness threshold, the object recognition apparatus determines that the target image has a liveness.

When the target image is determined not to be registered in operation 833, the object recognition apparatus may immediately finally determine that a recognition fails. In an example, the object recognition apparatus may alternatively acquire a new object image and repeat the process beginning in operation 810. For example, when registration data matching the calculated target output data does not exist in the registration DB, the object recognition apparatus acquires a new object image. This repetition with respect to new object images may be performed for set number of times before another repetition is not performed and recognition is determined to be unavailable, for example.

Rather, when the liveness test of the target image fails in operation 850, the object recognition apparatus may perform an object recognition of an image corresponding to another frame of the object image, i.e., other than the input image or the target image. For example, when the liveness test of the target image fails, the object recognition apparatus changes the current frame image to a next frame image and selects the next frame image as a new target image. In this example, when an additional verification of the target image fails, the object recognition apparatus newly extracts target intermediate data based on the partial layer from the next target image. In this example, the object recognition apparatus verifies the next target image based on the new target intermediate data and the reference intermediate data.

In response to a recognition and any additional verification of the object image being determined valid, the object recognition apparatus may finally determine that the recognition succeeds in operation 860. For example, when the input image is identified to be registered in the registration DB and is also determined to have a liveness, the object recognition apparatus finally determines that a full recognition of the input image succeeds. Also, when it is determined that the target image matches the input image and has a liveness, the object recognition apparatus finally determines that a recognition of the target image succeeds.

The object recognition apparatus may thus perform the above-described operations 820, 821, 822, 823, 830, 831, 832 and 833 based on the same object model or respective object models that have the same trained parameters.

For example, if a first identification is valid, but a corresponding additional verification is not valid, the object recognition apparatus may again attempt to recognize the corresponding object image through a subsequent simplified recognition operation of a target image that reduces the amount of time used to identify the target image using a partial layer of an object model based on a success of the first identification. For example, by relying on the success of the first identification, the simplified recognition for the target may be performed without needing to perform registration information comparisons that would otherwise typically be performed, which may substantially decrease the overall amount of time for recognizing and verifying an object image.

As noted above, in the comparison of the target intermediate data to the reference intermediate data, the object recognition apparatus compares an extracted lower-level feature of an input image and an extracted lower-level feature of the target image from a partial layer of the object model, and as a result of the comparison thereby determines whether objects in the input image and the target image are sufficiently identical to each other. When the input image and the target image are verified to be sufficiently identical to each other, the object recognition apparatus may then immediately perform the additional verification of the liveness of the target image, e.g., rather than having to complete the remaining calculations of the remaining layers of the object model for the target image. Thus, though the liveness of the input image may initially be determined to fail, the object recognition apparatus may thereafter determine the liveness of the input image to be valid based on the determined valid liveness of the target image, and thus, finally determine that a pre-identified user for the corresponding object image is recognized. The object recognition apparatus may then permit the user to access further functions of the object recognition apparatus, such as by unlocking the object recognition apparatus or authorize other operations of the object recognition apparatus such as payment authorization.

Figure 9:
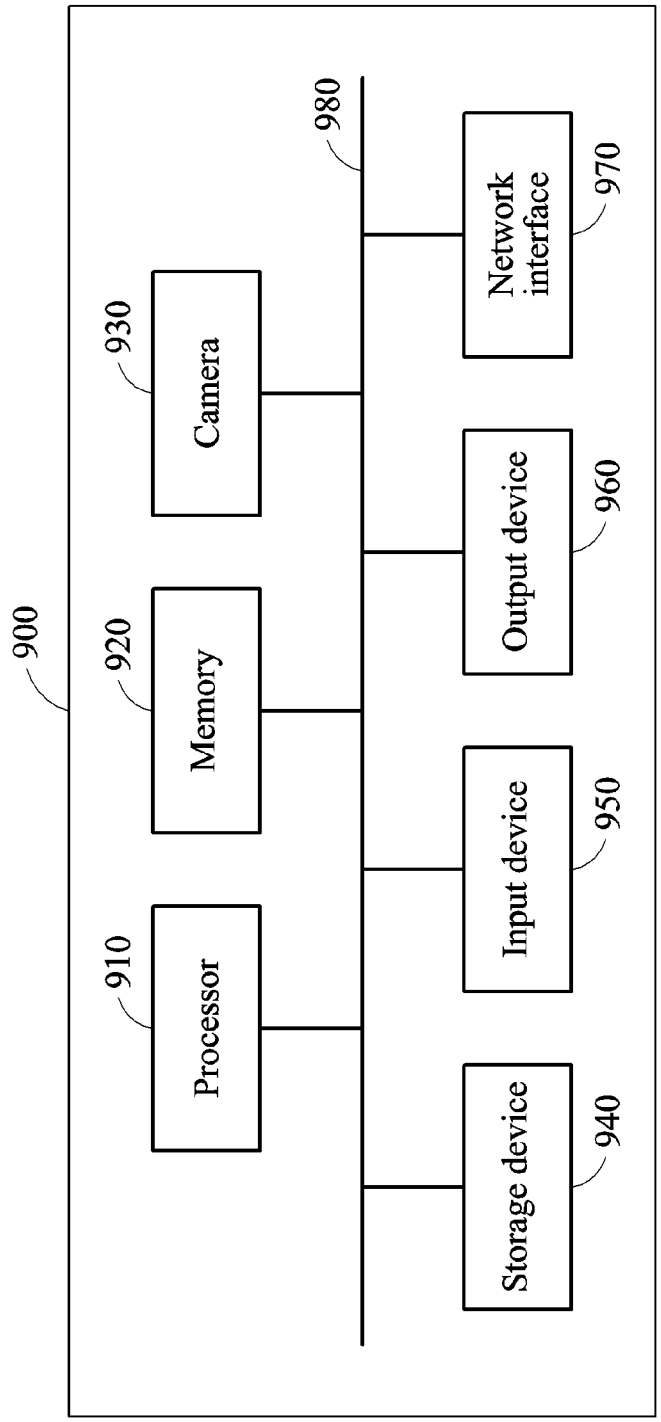
FIG. 9 is a block diagram illustrating an example of a computing apparatus.

FIG. 9 is a block diagram illustrating an example of a computing apparatus.

A computing apparatus 900 performs a recognition process by obtaining an input image, e.g., in which a face of a user is represented, and performs a registration based identification and liveness determination of the input image for recognizing the user. The computing apparatus 900 may correspond to the object recognition apparatus 200 of FIG. 2, as well as the object recognition training apparatus 300 of FIG. 3 and apparatuses otherwise discussed herein, as non-limiting examples.

The computing apparatus 900 includes a processor 910, a memory 920, a camera 930, a storage device 940, an input device 950, an output device 960, and a network interface 970. As noted above, in an example, the processor 910 and the memory 920, and the camera 930 may respectively correspond to the processor 220, memory 230, and image sensor 210 of FIG. 2 and/or the processor 320 and memory 330 of FIG. 3. The processor 910, the memory 920, the camera 930, the storage device 940, the input device 950, the output device 960, and the network interface 970 communicate with one another through a communication bus 980.

The processor 910 may implement functions and instructions in the computing apparatus 900 as described herein. For example, the processor 910 may execute instructions stored in the memory 920 and/or the storage device 940, as discussed above with respect to FIGS. 1-8. Accordingly, the processor 910 may be configured to perform one or more or all processes, stages, or operations described with reference to FIGS. 1-8. In addition, the processor 910 is configured to control other functions of the computing apparatus 900. For example, the computing apparatus 900 may be mobile device, such as a mobile phone, tablet, or personal computer, and thus the processor 910 is further configured to control or implement other typical functions of the computing apparatus 900. In an example, the processor 910 may be configured to implement an indication, either explicitly or implicitly, of the ultimate successfulness of the recognition of the object image. Such implicit indications may include selectively controlling a lock-out operation to only permit a user to access or implement such other typical functions upon a successful identification and liveness determination of the user's captured face image, e.g., through an input image or a subsequent target image selectively using a simplified recognition operation. As noted, the computing apparatus 900 may include, for example, various electronic systems, for example, a mobile device such as a mobile phone, a smartphone, a personal digital assistant (PDA), a tablet computer or a laptop computer, a computing device such as a PC, a netbook computer, or an electronic product such as a TV, a smart TV or a security device for a gate control, as non-limiting examples.

The memory 920 is a non-transitory computer readable media or device that store information to be used for the recognition and liveness determinations. The memory 920 may further include a registration DB that stores registration data that is considered during the recognition operation of the input image and selectively considered during consideration of a subsequent target image when liveness determination of the input image fails. The memory 920 includes a computer-readable storage medium or a computer-readable storage device. In addition, memory 920 is further representative of multiple such types of memory. The memory 920 may store the example instructions to be implemented or executed by the processor 910 and stores related information generated or relied upon during software an application execution by the computing apparatus 900.

The camera 930 captures a still image, a video, or both. The processor 910 may control the camera 930 to capture an object image, e.g., including a face region, a fingerprint image, an eye or iris image, and/or a blood vessel image, as only example, of a user attempting at the corresponding authentication, e.g., through successful identification and liveness determinations, or may control the camera 930 to autonomously capture images and automatically identify and perform liveness determinations of a user, for example, without user initiation. In addition, as noted above, the camera 930 may also be controlled by the processor 910 during other functions of the computing apparatus 900, such as when operated as a personal camera.

The storage device 940 includes a non-transitory computer-readable storage medium or a computer-readable storage device. The storage device 940 may also or alternatively store the registration database. In one example, the storage device 940 stores a greater amount of information than the memory 920, and stores the information for a long period of time. For example, the storage device 940 may include, for example, a magnetic hard disk, an optical disc, a flash memory, a floppy disk, and nonvolatile memories in other forms that are well-known in the technical field to which the present disclosure pertains. Either of the storage device 940 or the memory 920 may store the object model and/or the liveness test model.

The input device 950 receives the input from the user through a tactile, video, audio, or touch input. For example, the input device 950 may include a keyboard, a mouse, a touch screen, a microphone, and other devices configured to detect an input from a user and transfer the detected input to the computing apparatus 900.

The output device 960 provides the user with an output of the computing apparatus 900 through a visual, auditory, or tactile channel. For example, the output device 960 includes a display, a touch screen, a speaker, a vibration generator, and other devices configured to provide an output to the user, such as indicating a result of the successful recognition, including the identification and liveness determinations, or providing addition visual and/or audible services or information indicative of the success of the recognition.

The network interface 970 communicates with an external device through a wired or wireless network. For example, through control of the processor 910 upon full recognition of a user, e.g., through successful identification and liveness test determinations, the network interface 970 may transmit a payment authorization to an external terminal, such as with an appropriate mobile payment instruction transmitted by near field transceiver. In addition, the processor 910 may control the network interface 970 to routinely check for updates for the object and/or liveness test models or corresponding neural network(s), for example, and request, receive, and store parameters or coefficients of the same in the memory 920 or storage device 940.

The object recognition apparatus 200, the image acquirer 210, the processor 220, the memory 230, the object recognition training apparatus 300, the processor 320, the memory 330, the computing apparatus 900, the processor 910, the memory 920, the camera 930, the storage device 940, the input device 950, the output device 960, the network interface 970, and the bus 980, and other apparatuses, devices, and other components described herein with respect to FIGS. 1-9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented object recognition method, the method comprising:
   recognizing an object of an input image using an object model;
   performing a first liveness verification of the input image in response to a success of the recognizing the object of the input image;
   verifying a target image using the object model and based on reference intermediate data previously extracted by a partial layer of the object model as used in the recognizing of the object of the input image, in response to a failure of the performed first liveness verification; and
   performing a second liveness verification, of the target image, in response to the target image being verified in the verifying of the target image.

2. The method of claim 1, wherein the first liveness verification and the second liveness verification are respective liveness verification operations performed using a liveness model.

3. The method of claim 1,
   wherein the recognizing of the object of the input image is a registration based recognition, and
   wherein, upon the target image being verified in the verifying of the target image, identification of the target image is performed without performing registration based recognition of the target image, and
   wherein, upon failure of the verifying of the target image, registration based recognition of the target image is performed.

4. The method of claim 1,
   wherein the recognizing of the object of the input image is registration based recognition, and
   wherein, upon the target image being verified in the verifying of the target image, the second liveness verification of the target image is performed without registration based recognition of the target image having been performed.

5. The method of claim 1, wherein the verifying of the target image comprises determining, based on the reference intermediate data, whether an object indicated by the target image is identical to an object indicated by the input image.

6. The method of claim 1, wherein the verifying of the target image comprises determining whether target intermediate data extracted by a partial layer of the object model used in the verifying of the target image matches the reference intermediate data, with the partial layer of the object model used in the verifying of the target image having a same layer intermediacy as the partial layer of the object model used in the recognizing of the object of the input image, and
   wherein the determining of whether the target intermediate data matches the reference intermediate data comprises:
   calculating a matching score between the target intermediate data and the reference intermediate data; and
   determining that the target image includes a same object as the input image in response to the matching score exceeding a predetermined threshold.

7. The method of claim 1, wherein the performing of the second liveness verification comprises determining whether the target image has determined sufficient liveness characteristics to indicate that an object included in the target image is a live body, and
   wherein the determining of whether the target image has the determined sufficient liveness characteristics comprises:
   calculating a liveness score of the target image using a liveness model; and determining that the target image has the sufficient liveness characteristics in response to the liveness score exceeding a predetermined liveness threshold.

8. The method of claim 1, further comprising:
acquiring an object image including a plurality of frames, with the target image and the input image being select frames of the object image.

9. The method of claim 8, wherein the recognizing of the object of the input image comprises:
extracting reference output data from the input image though the use of the object model; and
determining that the input image is identified in response to a determination that registration data matching the reference output data exists in a registration database (DB), and
wherein the determining that the input image is identified comprises:
calculating a matching score between the reference output data and the registration data; and
determining that an object of the input image is identical to an object of the registration data in response to the matching score exceeding an output threshold.

10. The method of claim 8, further comprising, during the recognizing of the object of the input image, storing the reference intermediate data extracted by the partial layer of the object model used in the object recognition of the input image.

11. The method of claim 1, wherein the verifying of the target image comprises:
in response to a failure of the verifying of the target image, calculating target output data, for the target image, as a result of a completion of an object recognition of the target image that further uses the object model used in the verifying of the target image; and
determining that the target image is identified in response to a determination that registration data matching the calculated target output data exists in a registration DB,
wherein the method further comprises:
in response to a determination that the calculated target output data does not match registration data in the registration DB, acquiring a new object image and performing an object recognition of a corresponding input image of the new object image.

12. The method of claim 1, wherein the target image and the input image are select frames of an object image, and the verifying of the target image comprises selecting, as the target image, a frame of the object image subsequent to the input image.

13. The method of claim 1, wherein the verifying of the target image comprises comparing target intermediate data extracted from the target image by an m-th layer among "n" total layers included in the object model used in the verifying of the target image to the reference intermediate data, the reference intermediate data being extracted from the input image by the m-th layer in the object model used in the recognizing of the object of the input image, wherein n is an integer greater than "1" and m is an integer greater than "0" and less than "n."

14. The method of claim 13, wherein the method further comprises selecting an integer value of m based on analysis of the input image, the target image, or an object image that includes a series of frames from which the input image and the target image are acquired.

15. The method of claim 1, further comprising:
determining that the object of the input image is successfully recognized in response to a determination that a matching score, between predetermined registration data and reference output data extracted from the input image by the object model used in the recognizing of the object of the input image, exceeds an output threshold,
wherein the verifying of the target image comprises determining whether another matching score between the reference intermediate data and target intermediate data extracted from the target image by the object model used in the verifying of the target image exceeds an intermediate threshold, and
wherein the intermediate threshold is greater than the output threshold.

16. The method of claim 1, further comprising:
acquiring a new object image in response to a failure of the recognizing of the object of the input image corresponding to a frame of a plurality of frames included in a previously acquired object image.

17. The method of claim 1, further comprising:
extracting target intermediate data, of another target image, based on a partial layer of the object model as used in a corresponding verification of the other target image in response to a failure of the second liveness verification of the target image, the other target image being an image corresponding to a frame subsequent to the target image,
wherein the corresponding verification of the other target image includes verifying the other target image based on the target intermediate data and the reference intermediate data.

18. A non-transitory computer-readable storage medium storing instructions that, when executed by a processor, cause the processor to perform the method of claim 1.

19. An apparatus with object recognition, the apparatus comprising:
a memory configured to store an object model; and
a processor configured to:
recognize an object of an input image using the object model;
perform a first liveness verification of the input image in response to a success of the recognizing of the object of the input image;
verify a target image using the object model and based on reference intermediate data previously extracted by a partial layer of the object model as used in the recognizing of the object of the input image, in response to a failure of the first liveness verification; and
perform a second liveness verification, of the target image, in response to the target image being verified in the verifying of the target image.

* * * * *